US012347880B2

(12) United States Patent
Kato

(10) Patent No.: US 12,347,880 B2
(45) Date of Patent: Jul. 1, 2025

(54) POWER STORAGE DEVICE AND METHOD OF MANUFACTURING POWER STORAGE DEVICE

(71) Applicant: TOYOTA JIDOSHA KABUSHIKI KAISHA, Toyota (JP)

(72) Inventor: Masashi Kato, Konan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 55 days.

(21) Appl. No.: 17/680,505

(22) Filed: Feb. 25, 2022

(65) Prior Publication Data

US 2022/0320656 A1 Oct. 6, 2022

(30) Foreign Application Priority Data

Mar. 31, 2021 (JP) .................. 2021-060576

(51) Int. Cl.
*H01M 50/224* (2021.01)
*H01M 50/231* (2021.01)
*H01M 50/233* (2021.01)
*H01M 50/276* (2021.01)
(Continued)

(52) U.S. Cl.
CPC ....... *H01M 50/224* (2021.01); *H01M 50/231* (2021.01); *H01M 50/233* (2021.01); *H01M 50/276* (2021.01); *H01M 50/289* (2021.01); *H01B 17/62* (2013.01)

(58) Field of Classification Search
CPC ............. H01M 50/224; H01M 50/231; H01M 50/289; H01M 50/276; H01M 50/233; H01B 17/62
See application file for complete search history.

(56) References Cited

U.S. PATENT DOCUMENTS

2006/0257732 A1* 11/2006 Yageta ............. H01M 50/1243
429/162
2007/0287043 A1* 12/2007 Marsh ................ H01M 8/0438
429/432
(Continued)

FOREIGN PATENT DOCUMENTS

CN 107069076 A * 8/2017
EP 2541668 A1 1/2013
(Continued)

OTHER PUBLICATIONS

MG Chemicals: "High Temperature Epoxy Encapsulating & Potting Compound 832HT Technical Data Sheet" Jan. 2016 (Year: 2016).*
(Continued)

*Primary Examiner* — Milton I Cano
*Assistant Examiner* — Albert Michael Hilton
(74) *Attorney, Agent, or Firm* — Sughrue Mion, PLLC

(57) ABSTRACT

A power storage device includes a case body made of metal and having an opening that opens in at least one direction, a power storage module placed inside the case body, a closing plate made of metal and welded to the case body so as to close the opening of the case body, an insulating sheet covering an inner surface of the case body and an inner surface of the closing plate, and a covering portion made of an insulating material and covering a boundary portion between the inner surface of the case body and the inner surface of the closing plate.

5 Claims, 2 Drawing Sheets

(51) Int. Cl.
*H01M 50/289* (2021.01)
*H01B 17/62* (2006.01)

(56) References Cited

U.S. PATENT DOCUMENTS

| | | | | |
|---|---|---|---|---|
| 2013/0004822 A1* | 1/2013 | Hashimoto | ....... | H01M 10/6554 |
| | | | | 429/120 |
| 2016/0020446 A1* | 1/2016 | Zheng | ................ | H01M 50/503 |
| | | | | 429/82 |
| 2018/0138487 A1* | 5/2018 | Kamiya | .............. | H01M 50/553 |
| 2021/0351471 A1* | 11/2021 | Choi | ................... | H01M 50/282 |

FOREIGN PATENT DOCUMENTS

| | | | |
|---|---|---|---|
| EP | 3451407 A1 | | 3/2019 |
| JP | 2003-187755 A | | 7/2003 |
| JP | 2012109275 A | * 6/2012 | ............ H01G 11/12 |
| JP | 2013051100 A | * 3/2013 | |
| KR | 10-2013-0004141 A | | 1/2013 |

OTHER PUBLICATIONS

Machine translation of JP-2012109275-A (Year: 2023).*
Machine translation of JP-2013051100-A (Year: 2024).*
Machine translation of CN107069076A (Year: 2024).*

* cited by examiner

POWER STORAGE DEVICE AND METHOD OF MANUFACTURING POWER STORAGE DEVICE

This nonprovisional application is based on Japanese Patent Application No. 2021-060576 filed on Mar. 31, 2021 with the Japan Patent Office, the entire contents of which are hereby incorporated by reference.

BACKGROUND

Field

The present disclosure relates to a power storage device and a method of manufacturing a power storage device.

Description of the Background Art

For example, Japanese Patent Laying-Open No. 2003-187755 discloses a secondary battery including a case and a plurality of electrodes accommodated in the case. The case includes a box-shaped portion that has an opening that opens upward, and a lid portion that covers the opening of the box-shaped opening. An insulating film is provided on an inner surface of the box-shaped portion and an inner surface of the lid portion.

SUMMARY

In the secondary battery disclosed in Japanese Patent Laying-Open No. 2003-187755, as the lid portion is welded to the box-shaped portion, the insulating film may melt at a boundary portion between the box-shaped portion and the lid portion. In this case, insufficient insulating properties are provided.

An object of the present disclosure is to provide a power storage device that can ensure insulating properties and a method of manufacturing the power storage device.

A power storage device according to an aspect of the present disclosure includes a case body made of metal and having an opening that opens in at least one direction, a power storage module placed in the case body, a closing plate made of metal and welded to the case body so as to close the opening of the case body, an insulating sheet covering an inner surface of the case body and an inner surface of the closing plate, and a covering portion made of an insulating material and covering a boundary portion between the inner surface of the case body and the inner surface of the closing plate.

A method of manufacturing a power storage device according to an aspect of the present disclosure includes: a preparation step of preparing a case body and a closing plate, the case body being made of metal, having an inner surface provided with an insulating sheet, and having an opening that opens in at least one direction, the closing plate being made of metal, having an inner surface provided with the insulating sheet, and being shaped to close the opening of the case body; a placing step of placing a power storage module inside the case body; a welding step of welding the closing plate to the case body so as to close the opening of the case body by the closing plate; and an injection step of injecting an insulating material from outside of the case body into the case body so as to form a covering portion covering a boundary portion between the inner surface of the case body and the inner surface of the closing plate.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
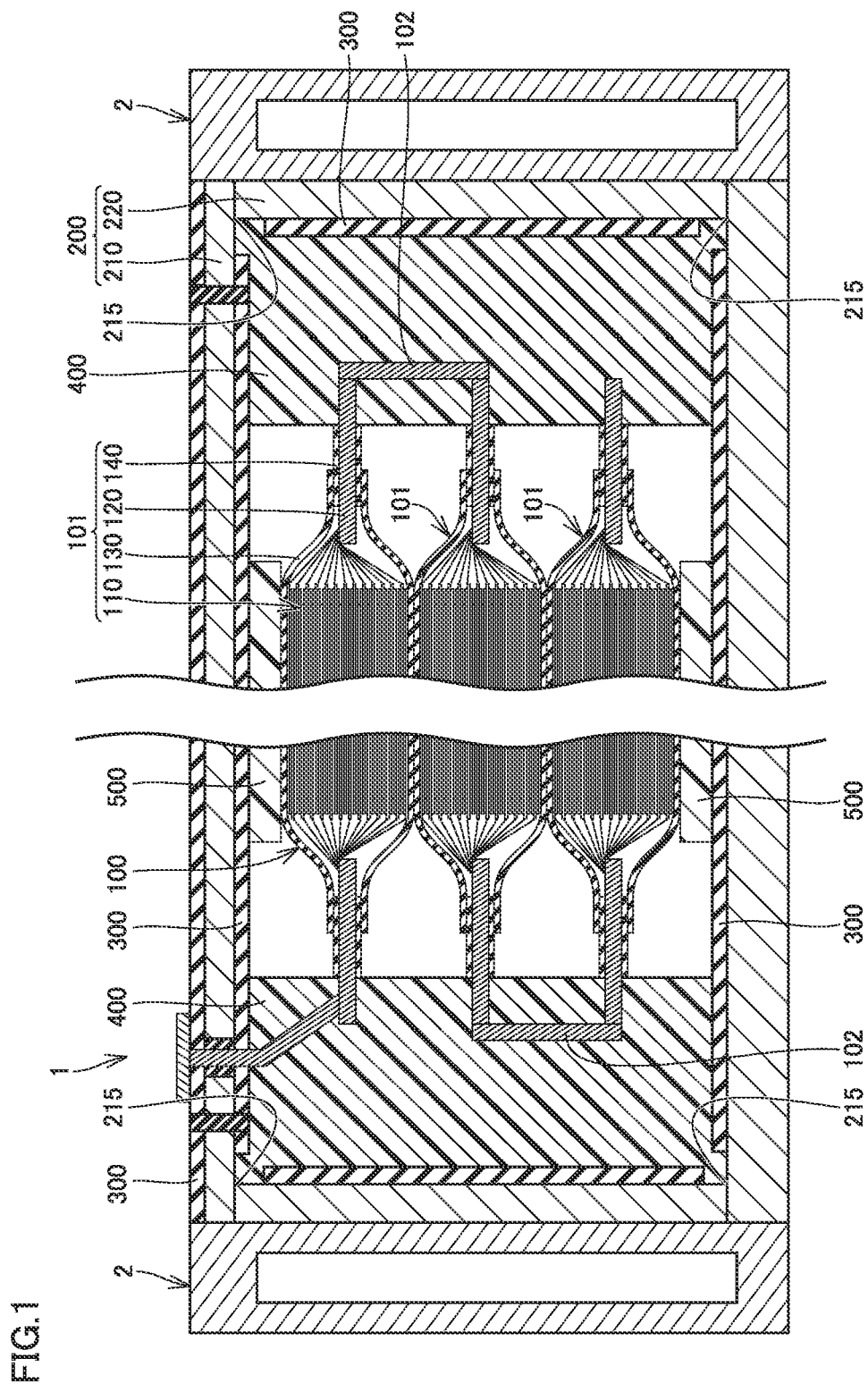
FIG. 1 is a sectional view schematically showing a configuration of a power storage device according to an embodiment of the present disclosure.

An embodiment of the present disclosure will be described with reference to the drawings. The same or corresponding elements in the drawings have the same reference characters allotted in the figures referenced below.

FIG. 1 is a perspective view schematically showing a configuration of a power storage device according to an embodiment of the present disclosure. A power storage device 1 is mounted on, for example, a vehicle.

As shown in FIG. 1, power storage device 1 includes a power storage module 100, a case 200, an insulating sheet 300, and a covering portion 400. A cooling device 2 may be provided to be in contact with power storage device 1.

Power storage module 100 includes at least one power storage cell 101. In the present embodiment, power storage module 100 includes a plurality of power storage cells 101. Power storage cells 101 are stacked in one direction. Although FIG. 1 shows three power storage cells 101, the number of power storage cells 101 is not particularly limited. An example of power storage cell 101 is a lithium ion battery.

Power storage cell 101 is a so-called laminate-type cell. Specifically, power storage cell 101 includes a plurality of electrode bodies 110, a current collector plate 120, a laminated film 130, an adhesive member 140, and an electrolyte solution (not shown). Power storage cell 101 may be formed of an all-solid-state battery having a solid electrolyte in place of a separator and an electrolyte solution.

Electrode bodies 110 are stacked in one direction. An end of each electrode body 110 is electrically connected to current collector plate 120.

Laminated film 130 covers electrode bodies 110 and a part of current collector plate 120. An end of current collector plate 120 protrudes from laminated film 130. Ends of the respective current collector plates 120 are connected to one another by a bus bar 102 such that power storage cells 101 are electrically connected in series. Laminated film 130 is connected to current collector plate 120 via adhesive member 140. Laminated film 130 is filled with an electrolyte solution.

Case 200 accommodates power storage module 100. Case 200 is made of a metal (such as aluminum). Case 200 includes a case body 210 and a closing plate 220.

Case body 210 has an opening that opens in at least one direction. In the present embodiment, case body 210 is shaped into a square tube having a central axis extending in a direction orthogonal to a direction of stacking of power storage cells 101. Case body 210 is provided with an inlet h (see FIG. 2).

Closing plate 220 is welded to case body 210 so as to close the opening of case body 210. Closing plate 220 is shaped into a flat plate.

Cooling device 2 is provided to be in contact with closing plate 220. In other words, cooling device 2 is provided to be in contact with case 200 in the direction orthogonal to the direction of stacking of power storage cells 101.

Insulating sheet 300 covers an inner surface of case body 210 and an inner surface of closing plate 220. Insulating sheet 300 may cover an outer surface of case body 210.

Covering portion 400 is made of an insulating material. Preferably, covering portion 400 is made of a thermally conductive material. Covering portion 400 covers a boundary portion 215 between the inner surface of case body 210 and the inner surface of closing plate 220. Covering portion 400 is formed by injecting the insulating material (in the present embodiment, a potting material) into case 200 through inlet h of case 200. Preferably, covering portion 400 cover the entire portion of current collector plate 120, which protrudes from laminated film 130, and the entire bus bar 102, together with adhesive member 140. Thus, a relative displacement of power storage module 100 to case 200 is reduced. Covering portion 400 covers insulating sheet 300 provided on the inner surface of closing plate 220.

Power storage device 1 may further include a restriction unit 500, as shown in FIG. 1. Restriction unit 500 is placed between power storage module 100 and case body 210. Restriction unit 500 may be placed between a pair of power storage cells 101 adjacent to each other.

Restriction unit 500 restricts a relative displacement of power storage module 100 to case 200 in the direction of stacking of power storage cells 101. Restriction unit 500 is made of, for example, a material having dilatancy characteristics. Specifically, when each power storage cell 101 is displaced relative to case 200 in the direction of stacking at a low speed, such as when each power storage cell 101 expands, restriction unit 500 elastically deforms to absorb the expansion of each power storage cell 101. On the other hand, when each power storage cell 101 is displaced relative to case 200 in the direction of stacking at a relatively high speed, such as when power storage device 1 vibrates, restriction unit 500 exhibits a relatively high modulus of elasticity, thereby restricting a relative displacement of each power storage cell 101 to case 200. This reduces resonance of power storage module 100 when power storage device 1 vibrates.

Preferably, power storage device 1 descried above has a volume resistivity of not less than $1.0 \times 10^6$ Ω·cm.

Next, a method of manufacturing power storage device 1 will be described. The method includes a preparation step, a placing step, a welding step, and an injection step.

In the preparation step, case body 210 with insulating sheet 300 provided on its inner surface and closing plate 220 with insulating sheet 300 provided on its inner surface are prepared.

In the placing step, power storage module 100 is placed inside case body 210 provided with insulating sheet 300.

Figure 2:
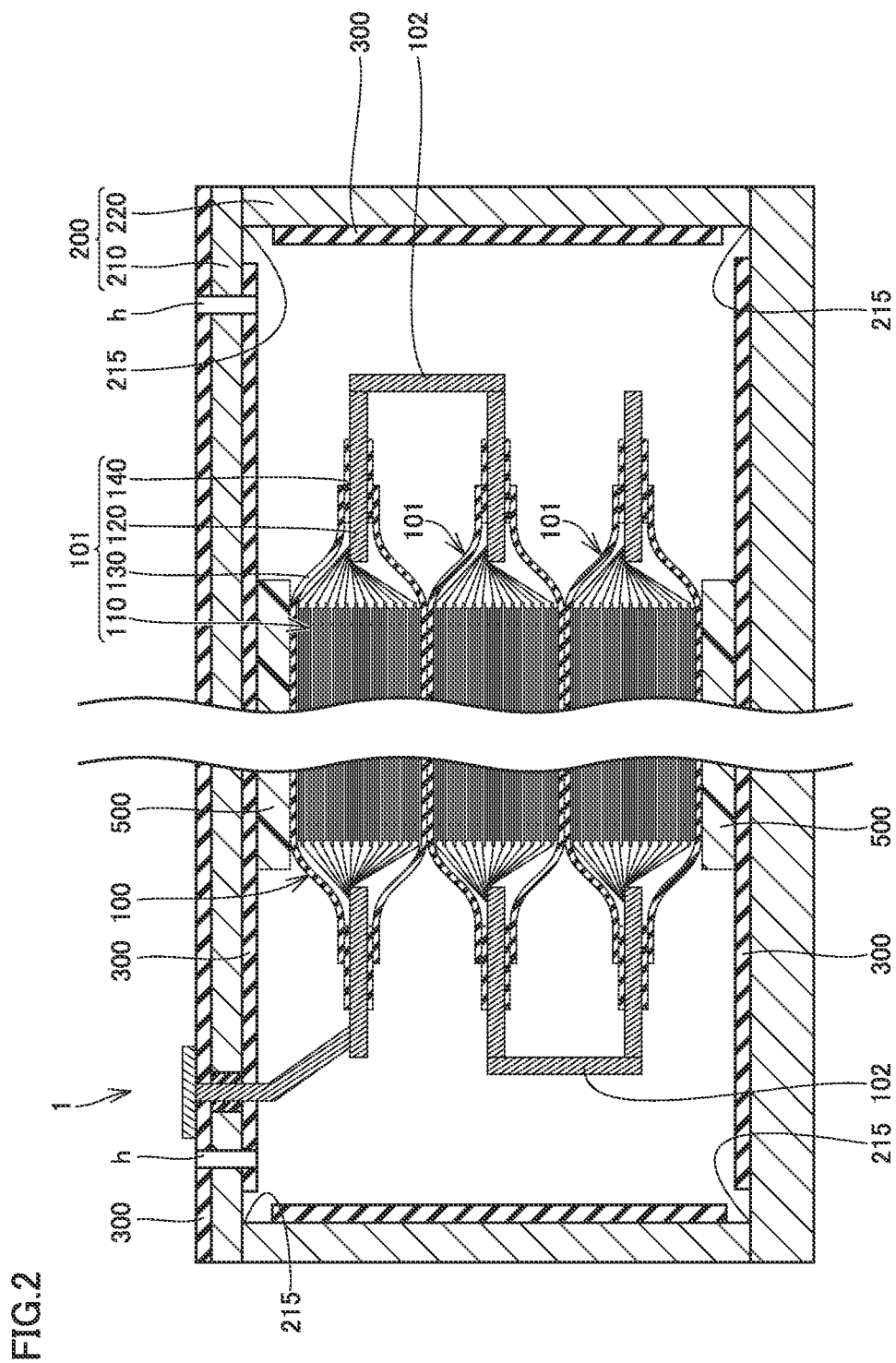
FIG. 2 is a sectional view schematically showing a state after a welding step.

In the welding step, closing plate 220 is welded to case body 210 such that the opening of case body 210 is closed by closing plate 220 provided with insulating sheet 300, as shown in FIG. 2. At this time, insulating sheet 300 covering boundary portion 215 between the inner surface of case body 210 and the inner surface of closing plate 220 may melt.

In the injection step, an insulating material is injected from outside of case 200 into case 200 through inlet h provided in case body 210 so as to form covering portion 400 covering boundary portion 215 between the inner surface of case body 210 and the inner surface of closing plate 220. The insulating material is a material (potting material) forming covering portion 400. In this step, a material having a viscosity of not less than 5 Pa·s is injected as the insulating material in order to increase permeability into boundary portion 215 (the part at which the inner surface of case 200 is exposed).

As descried above, in power storage device 1 of the present embodiment, the inner surface of case body 210 and the inner surface of closing plate 220 are covered with insulating sheet 300, and boundary portion 215 between the inner surface of case body 210 and the inner surface of closing plate 220 is covered with covering portion 400, so that insulation properties are ensured.

In the embodiment described above, the main surface of power storage cell 101 is not cooled via case 200 from outside of case 200 in the direction of stacking of power storage cells 101, but current collector plate 120 and bus bar 102 are cooled by cooling device 2, via covering portion 400 made of the potting material, from the lateral portion of case 200 in the direction orthogonal to the direction of stacking. Since current collector plate 120 and bus bar 102 are made of metal, power storage module 100 is cooled effectively. The dimension of the entire apparatus including power storage device 1 and cooling device 2 can be reduced in the direction of stacking.

It will be appreciated by a person skilled in the art that the exemplary embodiment described above provides specific examples of the following aspects.

A power storage device in the embodiment described above includes a case body made of metal and having an opening that opens in at least one direction, a power storage module placed inside the case body, a closing plate made of metal and welded to the case body so as to close the opening of the case body, an insulating sheet covering an inner surface of the case body and an inner surface of the closing plate, and a covering portion made of an insulating material and covering a boundary portion between the inner surface of the case body and the inner surface of the closing plate.

In this power storage device, the inner surface of the case body and the inner surface of the closing plate are covered with the insulating sheet, and the boundary portion between the inner surface of the case body and the inner surface of the closing plate is covered with the covering portion, so that insulating properties are ensured.

Preferably, the power storage device has a volume resistivity of not less than $1.0 \times 10^6$ Ω·cm.

A method of manufacturing a power storage device in the embodiment described above includes: a preparation step of preparing a case body and a closing plate, the case body being made of metal, having an inner surface provided with an insulating sheet, and having an opening that opens in at least one direction, the closing plate being made of metal, having an inner surface provided with the insulating sheet, and being shaped to close the opening of the case body; a placing step of placing a power storage module inside the case body; a welding step of welding the closing plate to the case body so as to close the opening of the case body by the closing plate; and an injection step of injecting an insulating material from outside of the case body into the case body so as to form a covering portion covering a boundary portion between the inner surface of the case body and the inner surface of the closing plate.

In this method, even when the insulating sheet has melted at the boundary portion between the inner surface of the case body and the inner surface of the closing plate in the welding step, the boundary portion is covered with the covering portion made of the insulating material in the injection step performed thereafter. Thus, a power storage device with ensured insulating properties is manufactured.

Preferably, in the injection step, a material having a viscosity of not less than 5 Pa·s is injected as the insulating material.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A method of manufacturing a power storage device, the method comprising:
    preparing a case body and a pair of closing plates, the case body being made of metal, the case body formed in a tube shape, and including: an inner surface provided with an insulating sheet, an inlet extending through a wall of the case body, and each of a pair of openings of the tube shape that opens in at least one direction, wherein each of the pair of closing plates is made of metal, having an inner surface provided with the insulating sheet, and being shaped to close each of the pair of openings of the case body;
    placing a power storage module inside the case body;
    welding the pair of closing plates to the case body so as to close the pair of openings of the case body by the pair of closing plates to form a case;
    after the welding, injecting an insulating material from outside of the case that was formed by the welding into the case through the inlet provided in the wall of the case body so as to form a covering portion inside of the case body that covers a boundary portion between the inner surface of the case body and the inner surface of the closing plate; and
    providing a pair of cooling devices each of which is in contact with an outer surface of each of the pair of closing plates of the case, wherein
    the power storage module includes a plurality of power storage cells and a bus bar electrically connecting the plurality of power storage cells in series,
    in the welding step, a part of the insulating sheet that covers the boundary portion melts to expose the boundary portion, and
    in the injection step, the insulating material is injected so as to cover the boundary portion exposed in the welding step and the bus bar.

2. The method of manufacturing a power storage device according to claim 1, wherein a material having a viscosity of not less than 5 Pa·s is injected as the insulating material.

3. The method of manufacturing a power storage device according to claim 1, wherein the covering portion formed by the injecting covers the insulating sheet provided on the inner surface of the closing plate.

4. The method of manufacturing a power storage device according to claim 1, wherein, after the welding step and before the injection step, the insulating sheet that covered the boundary portion is melted so that the boundary portion includes a part of the inner surface of the case body which is not provided with the insulating material and a part of the inner surface of the closing plate which is not provided with the insulating material.

5. The method of manufacturing a power storage device according to claim 3, wherein, after the welding step and before the injection step, the insulating sheet that covered the boundary portion is melted so that the boundary portion includes a part of the inner surface of the case body which is not provided with the insulating material and a part of the inner surface of the closing plate which is not provided with the insulating material.

* * * * *